(12) United States Patent
Cooper et al.

(10) Patent No.: US 11,327,776 B2
(45) Date of Patent: *May 10, 2022

(54) CENTRALIZED APPLICATION PROGRAMMING INTERFACE MONITORING TOOL

(71) Applicant: ADP, LLC, Roseland, NJ (US)

(72) Inventors: Thomas A. Cooper, Sutton, MA (US); Nick Heasman, Roseland, NJ (US); Ijoni Meta, Roseland, NJ (US)

(73) Assignee: ADP, INC., Roseland, NJ (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/997,081

(22) Filed: Aug. 19, 2020

(65) Prior Publication Data
US 2020/0379784 A1 Dec. 3, 2020

Related U.S. Application Data

(63) Continuation of application No. 16/524,677, filed on Jul. 29, 2019, now Pat. No. 10,761,864, which is a
(Continued)

(51) Int. Cl.
*G06F 3/0484* (2022.01)
*G06F 9/451* (2018.01)
(Continued)

(52) U.S. Cl.
CPC ............ *G06F 9/451* (2018.02); *G06F 3/0484* (2013.01); *G06F 9/54* (2013.01); *G06F 9/546* (2013.01); *G06F 16/22* (2019.01); *G06F 16/951* (2019.01)

(58) Field of Classification Search
CPC . H04L 41/22; G06F 3/04847; G06F 3/04842; G06F 17/30864; G06F 3/0484; G06F 9/54
See application file for complete search history.

(56) References Cited

U.S. PATENT DOCUMENTS 7,908,462 B2   3/2011   Sung
8,555,275 B1   10/2013  Gokhale et al.
(Continued)

FOREIGN PATENT DOCUMENTS

TW    201102808    1/2011
WO    2013039847   3/2013

OTHER PUBLICATIONS

Hui et al., "Visual monitoring of network devices based on Google Maps"., vol. 401-403, 3rd International Conference on Frontiers of Manufacturing Science and Measurin, pp. 2013.
(Continued)

*Primary Examiner* — Anil K Bhargava
(74) *Attorney, Agent, or Firm* — Alissa Pohlman; Andrew M. Calderon; Roberts Calderon Safran & Cole, P.C.

(57) ABSTRACT

Methods and systems for the collecting and monitoring of information related to the performance of application programming interfaces (APIs) are provided. A method includes obtaining one or more various measurements of performance of the APIs, and assessing a performance status for each API based on the obtained one or more various measurements of performance. The method further includes displaying, the performance status for each API and the APIs, and searching for a particular API of the displayed APIs using a search technique configured to compare a keyword indicative of the particular API to all fields of JavaScript Object Notation (JSON) objects that have been used to define the APIs. The method further includes displaying the particular API including the performance status for the particular API, the one or more various measurements of performance for the particular API, and methods of the particular API, as a result of the searching.

19 Claims, 12 Drawing Sheets

Related U.S. Application Data continuation of application No. 15/830,437, filed on Dec. 4, 2017, now Pat. No. 10,365,933, which is a continuation of application No. 15/460,460, filed on Mar. 16, 2017, now Pat. No. 9,904,560, which is a continuation of application No. 14/512,064, filed on Oct. 10, 2014, now Pat. No. 9,646,092.

(51) Int. Cl.
*G06F 16/22* (2019.01)
*G06F 16/951* (2019.01)
*G06F 9/54* (2006.01)

(56) References Cited

U.S. PATENT DOCUMENTS

| | | | |
|---|---|---|---|
| 8,640,216 | B2 | 1/2014 | Anderson et al. |
| 2005/0076327 | A1* | 4/2005 | Helal ............... G06F 8/30 717/100 |
| 2005/0203673 | A1 | 9/2005 | El-Hajj et al. |
| 2005/0256732 | A1 | 11/2005 | Bauer et al. |
| 2008/0086305 | A1 | 4/2008 | Lewis et al. |
| 2008/0209451 | A1* | 8/2008 | Michels ............ G06F 9/54 719/328 |
| 2008/0301754 | A1 | 12/2008 | Furuichi et al. |
| 2008/0307387 | A1* | 12/2008 | Yoon ............... G06F 11/3612 717/110 |
| 2011/0113405 | A1* | 5/2011 | Guerrera ........... G06F 11/3419 717/125 |
| 2012/0143616 | A1 | 6/2012 | Pulak et al. |
| 2012/0144250 | A1 | 6/2012 | Lee |
| 2012/0266231 | A1 | 10/2012 | Spiers et al. |
| 2012/0278822 | A1* | 11/2012 | De Jong ........... G06F 9/54 719/328 |
| 2013/0066925 | A1 | 3/2013 | Szyperski et al. |
| 2013/0104150 | A1* | 4/2013 | Rdzak ............ G06F 9/54 719/328 |
| 2013/0132854 | A1 | 5/2013 | Raleigh et al. |
| 2013/0145205 | A1 | 6/2013 | Lee |
| 2014/0047107 | A1 | 2/2014 | Maturana et al. |
| 2014/0059647 | A1 | 2/2014 | Immonen et al. |
| 2014/0108665 | A1 | 4/2014 | Arora et al. |
| 2015/0220376 | A1* | 8/2015 | Srivastava ........ G06F 11/327 714/37 |
| 2016/0057107 | A1* | 2/2016 | Call ............... H04L 63/0236 726/11 |
| 2016/0267153 | A1* | 9/2016 | Witkop ............ G06F 21/629 |

OTHER PUBLICATIONS

Bo et al.,"Grid View: A Dynamic and Visual Grid Monitoring System", Institute of Computing Technology, Chinese academy of Science Beijing 100039., Publication 2004, 4 pages.

Sivaraman et al.,"Virtualizing the Access Network via Open APIs",University of New South Wales Sydney, Australia, Dec. 9-12, 2013, 12 pages.

Author: N/A., "Virtualized API Stacks"Source: http://apievangelist.com/2013/01/28/virtualized-api-stacks/, 4 pages.

Hwang et al.,"A Flexible Failure Handling Framework for the Grid", Information Sciences Institute, University of Southern California,2003 IEEE, 12 pages.

Kolos et al.,"Event Monitoring Design", Monitoring, Event, Sampling, Mar. 24, 2005, 16 pages.

\* cited by examiner

CENTRALIZED APPLICATION PROGRAMMING INTERFACE MONITORING TOOL

TECHNICAL FIELD

The invention relates to software performance and, more particularly, to methods and systems for the collecting and monitoring of information related to the performance of application programming interfaces.

BACKGROUND

An application programming interface (API) specifies how various software components should interact with each other. In addition to accessing databases or computer hardware, such as hard disk drives or video cards, an API can be used to ease the work of programming graphical user interface components, to allow integration of new features into existing applications (a so-called "plug-in API"), or to share data between otherwise distinct applications. In practice, many times an API comes in the form of a library that includes specifications for routines, data structures, object classes, and variables. In some other cases, notably for Simple Object Access Protocol (SOAP) and Representational State Transfer (REST) services, an API comes as a specification of remote calls exposed to the API consumers.

An enterprise (e.g., a corporation) typically releases its API to third parties such that software developers can design products that are powered by the enterprise's services or shared data. To this end, a robust API for accessing Web based software applications or Web tools has become useful for enterprises practicing business models such as Software as a Service (SaaS) and infrastructure as a service (IaaS) since a majority of customers of these enterprises require interoperability with other SaaS applications, web services, and legacy systems. Furthermore, reliable performance of APIs is important for these enterprises to maintain services and customer loyalty, and developing technologies and tools to monitor API performance metrics for the services that these enterprises use is a key step toward achieving that goal.

Technologies and tools have been developed to monitor API performance metrics for the services that enterprises use, provide, or need through the released APIs. However, these technologies and tools provide users, such as software developers, with large amounts of performance data across the entire technology stack, from the underlying Infrastructure resource metrics up through API level runtime parameters. The burden is then on the user, such as the software developer, to sift through this often voluminous performance data to pick out symptoms of potential performance bottlenecks and accordingly decides on an appropriate course of action. Although such monitoring and prompt decision making by a user are crucial from a performance perspective, they can be extremely time consuming. In addition, the quality of the result depends on the experience of the user reviewing the performance data and making decisions regarding future capacity needs.

SUMMARY OF THE INVENTION

In a first aspect of the invention, a method is provided for providing performance data for a plurality of APIs. The method includes obtaining, by a computer system, one or more various measurements of performance of the APIs. The method further includes assessing, by the computer system, a performance status for each API based on the obtained one or more various measurements of performance. The method further includes displaying, by the computer system, the performance status for each API and the APIs. The method further includes searching, by the computer system, for a particular API of the displayed APIs using a search technique configured to compare a keyword indicative of the particular API to all fields of JavaScript Object Notation (JSON) objects that have been used to define the APIs. The method further includes displaying, by the computer system, the particular API including the performance status for the particular API, the one or more various measurements of performance for the particular API, and methods of the particular API, as a result of the searching.

In another aspect of the invention, a computer system is provided for collecting and monitoring performance data for a plurality of APIs. The computer system includes a hardware memory device that stores program instructions. The computer system further includes a processor that executes the program instructions and causes the computer system to obtain one or more various measurements of performance of the APIs on one or more computing devices operably connected to a network. The program instructions are further operable to causes the computer system to assess a performance status for each of the APIs based on the obtained one or more various measurements of performance. The program instructions are further operable to causes the computer system to display the performance status for each of the APIs. The program instructions are further operable to causes the computer system to initiate a live API call to a running application on the one or more computing devices using parameters of a method of one of the APIs. The program instructions are further operable to causes the computer system to receive data in an open standard format used by the API for transmitting data from a software application on the one or more computing devices.

In a further aspect of the invention, a computer program product is provide for that includes computer readable program instructions stored on non-transitory computer readable storage medium. The computer readable program instructions are operable to cause a computing device to obtain one or more various measurements of performance of a plurality of APIs. The computer readable program instructions are further operable to cause a computing device to assess a performance status for each API based on the obtained one or more various measurements of performance. The computer readable program instructions are further operable to cause a computing device to display, at a computing device with a screen display, at least a portion of a dashboard including the performance status for each API and the APIs. The computer readable program instructions are further operable to cause a computing device to detect a first input on the dashboard that initiates a comparison of a keyword indicative of a particular API to all fields of JavaScript Object Notation (JSON) objects that have been used to define the APIs. The computer readable program instructions are further operable to cause a computing device to in response to detecting the first input, display methods of the particular API in a first additional window. The computer readable program instructions are further operable to cause a computing device to detect a second input at a location of a method on the first additional window. The computer readable program instructions are further operable to cause a computing device to in response to detecting the second input, display parameters of the method in a second additional window. The computer readable program instructions are further operable to cause a computing device to detect a third input at a location of a mechanism on the second additional window. The computer readable program instructions are further operable to cause a computing device to in response to detecting the third input, initiate a live API call to a running application on one or more computing devices using the parameters of the method of the particular API.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF ASPECTS OF THE INVENTION

The invention relates to software performance and, more particularly, to methods and systems for the collecting and monitoring of information related to the performance of application programming interfaces (APIs). More specifically, implementations of the invention provide methods and systems for collecting and monitoring various measurements of performance of APIs such that a performance status of each API may be assessed, and intuitively visualized and interacted with on a graphic user interface (GUI). Advantageously, in embodiments, the methods and systems of the present invention may be implemented to improve API performance, attract developers, troubleshoot problems, and, ultimately, make better business decisions related to API infrastructure.

In embodiments, users on a network can access a website configured to collect and monitor various measurements of performance of APIs, which may then be assessed to determine a performance status of each API. The various measurements of performance of APIs may include a total number of request messages, a total number of errors, a number of developers, a number of applications in use, a total response time, a size of each request message, duration of request processing, a size of each message sent, longest response time, shortest response time, and others, and may be determined using various formulations known to those of skill in the art. For example, the determination of a total number of errors may include monitoring and keeping a running count of errors generated by each API. As another example, the determination of total response time may include the use of requests and time commands to measure the time of processing the request. By way of another example, the determination of size of each request message may include retrieving size data from the header of each message.

In embodiments, once the measurements of performance of APIs are assessed, the API and performance status of each API may be visualized on a GUI at an instance in time. Additionally, in embodiments, the methods for each API may be accessed to retrieve greater detail concerning each API, and a live API call may be made from the GUI using one or more methods of the API that return data in an open standard format, e.g., JavaScript Object Notation (JSON) or extensible markup language (XML), used by the API for transmitting data between software applications. Advantageously, the systems and methods of the present invention allow for the measurements of performance to be collected and assessed for each API, and the API and performance status of each API to be visualized and interacted with via a web based GUI.

Figure 1:
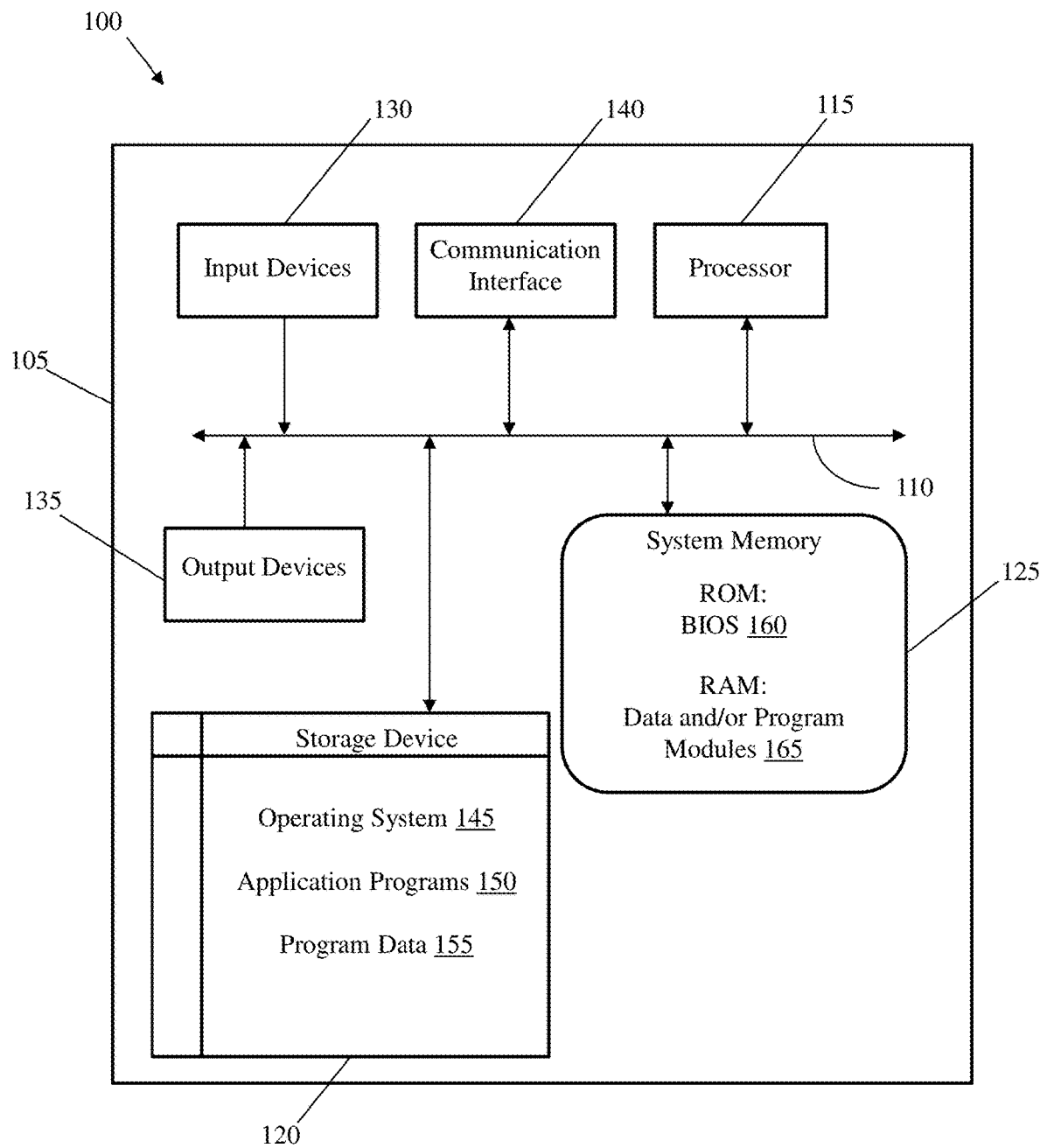
FIG. 1 is an illustrative architecture of a computing system implemented as embodiments of the present invention.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors, microprocessors, or specialized dedicated processors that include processing circuitry operative to interpret and execute computer readable program instructions, such as program instructions for controlling the operation and performance of one or more of the various other components of computing device 105 for implementing the functionality, steps, and/or performance of the present invention. In embodiments, processor 115 interprets and executes the processes, steps, functions, and/or operations of the present invention, which may be operatively implemented by the computer readable program instructions. For example, the processor 115 may be configured to provide the functionality of collecting and monitoring various measurements of performance of APIs such that a performance status of each API may be assessed, and intuitively visualized and interacted with on a GUI. In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention. In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to collect and monitor various measurements of performance of APIs such that a performance status of each API may be assessed, and intuitively visualized and interacted with on a GUI. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
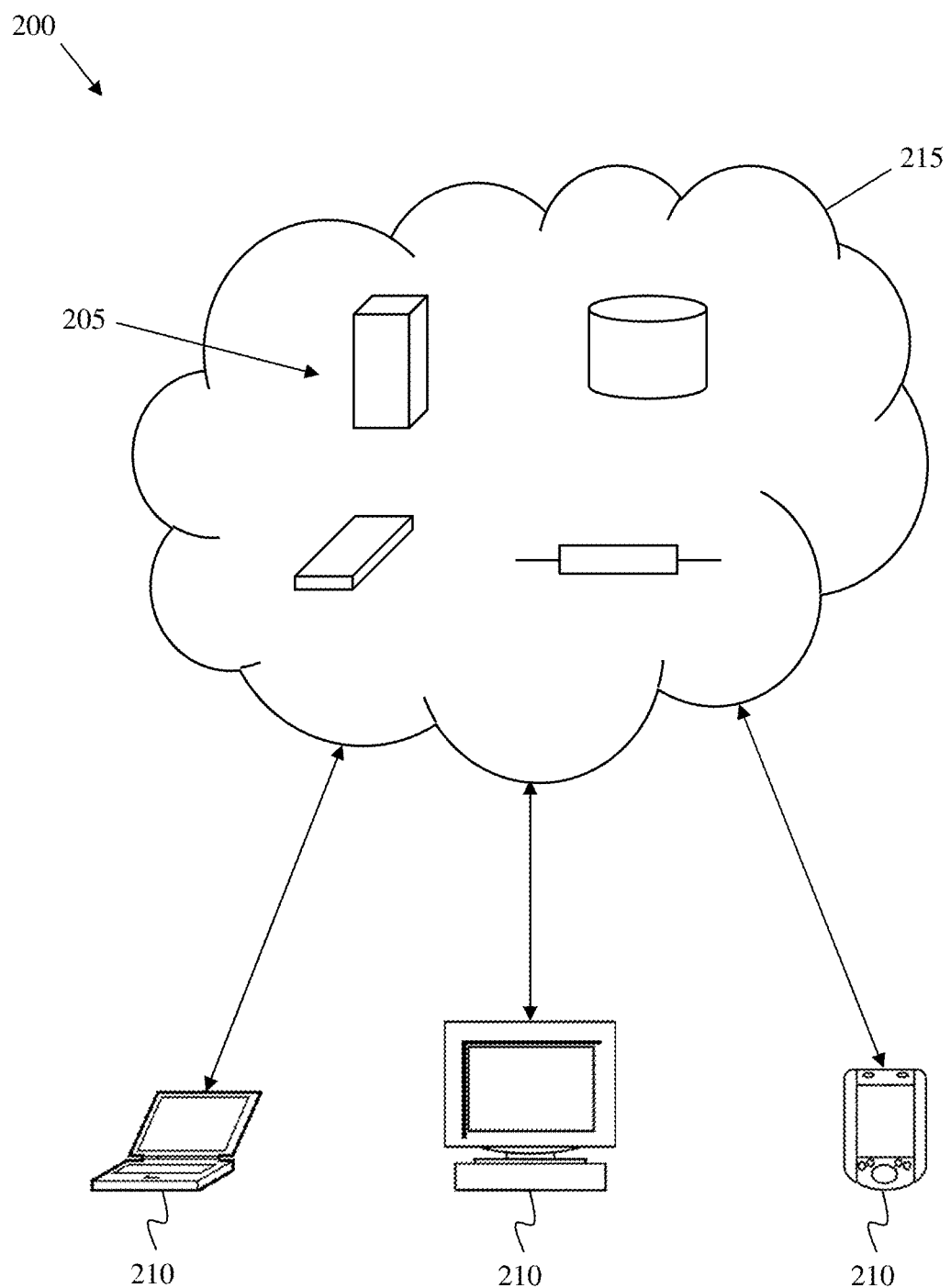
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level APIs. The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
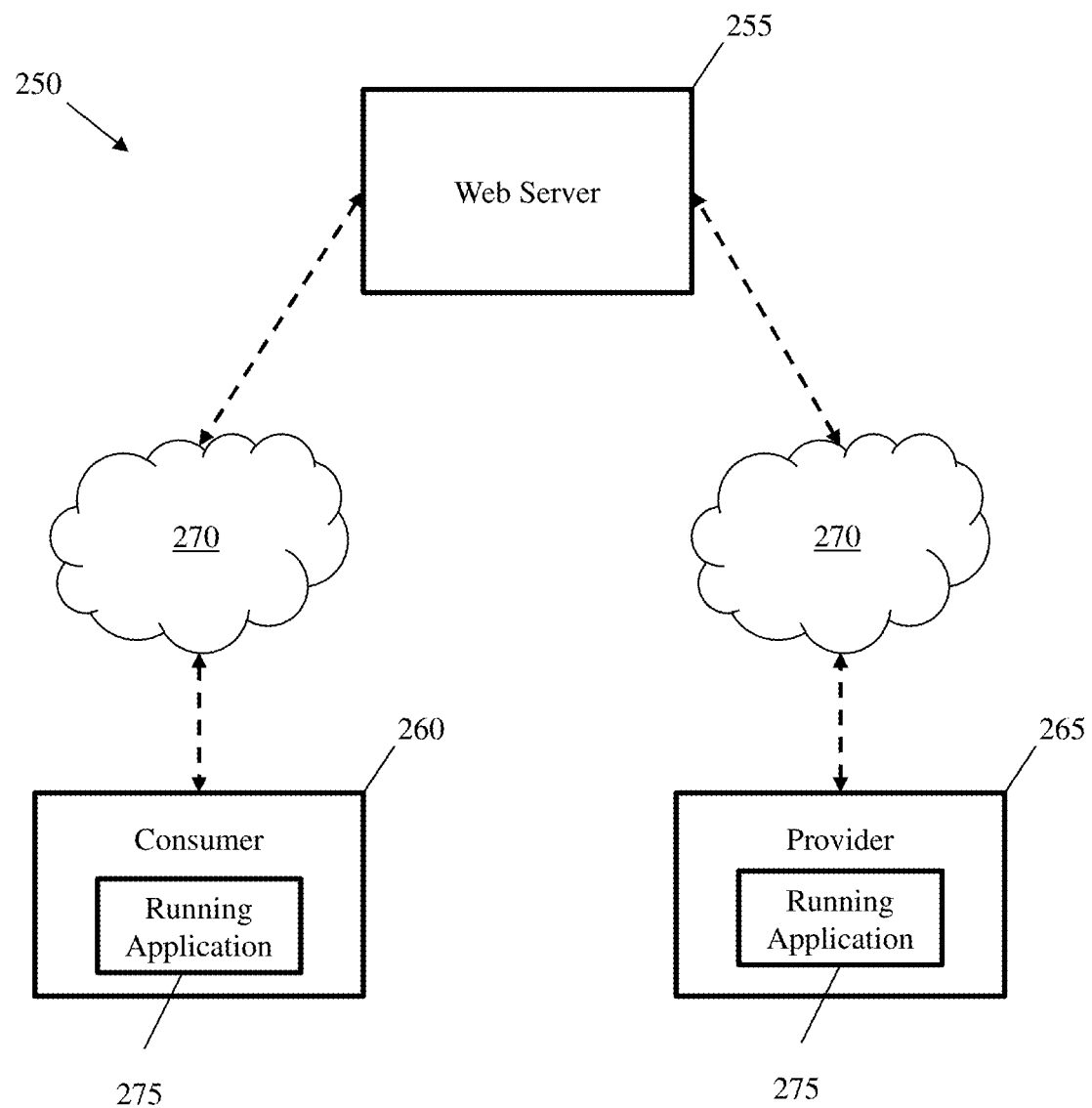
FIGS. 3 and 4 show block diagrams in accordance with aspects of the invention.

FIG. 3 shows a block diagram in accordance with some aspects of the invention. More specifically, FIG. 3 shows a functional block diagram that illustrates functionality of some aspects of the invention. In embodiments, FIG. 3 depicts system 250 comprising a web server 255 in communication with a consumer computing device 260 and a provider computing device 265 via a network 270 (e.g., the Internet, a local area network, a wide area network and/or a wireless network). In embodiments, system 250 may also include any devices (not shown) configured to be used in a data center, cloud environment, or other network devices, such as routers, servers, or mobile devices. The web server 225 may be, for example, either the hardware (e.g., computing device 105 described with respect to FIG. 1) and/or the software (e.g., a computer application or program) that is configured to deliver web content (e.g., hosting of a website) that can be accessed through the network 270.

In embodiments, the consumer computing device 260 may be configured to communicate with the provider computing device 265 to request a particular functionality or obtain one more sets of data (e.g., car dealership data). For example, the consumer computing device 260 may communicate with the provider computing device 265 using an API through the web server 255. More specifically, consumer computing device 260 may be configured to send a JavaScript request for procuring a particular functionality or obtaining one or more data sets to the web server 255 via the network 270, and a Java Database Connectivity (JDBC) API on the web server 255 may forward the data request to the provider computing device 265 via the network 270 for requesting the particular functionality or retrieving the one or more data sets.

Figure 4:
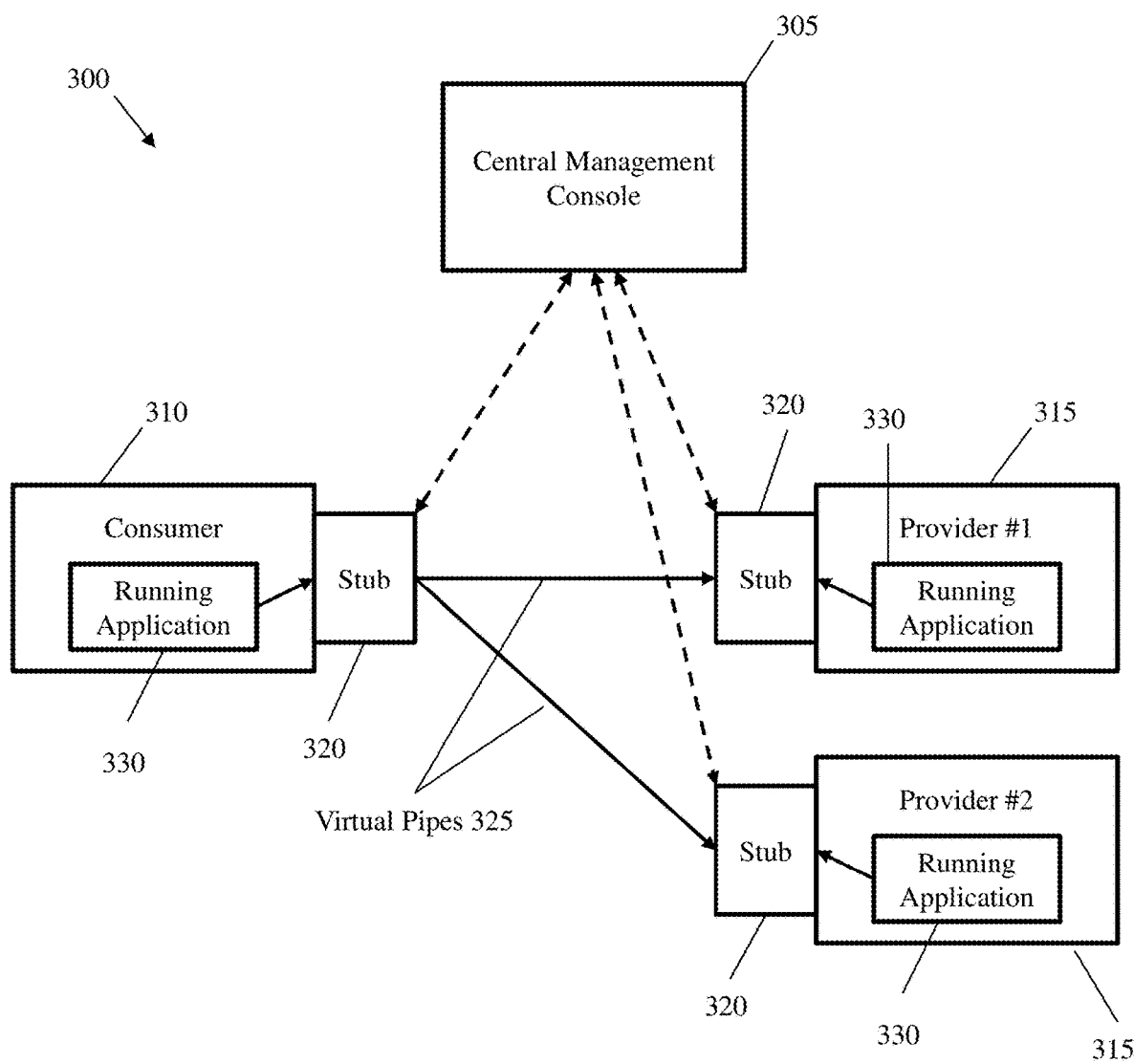

FIG. 4 shows a block diagram in accordance with other aspects of the invention. More specifically, FIG. 4 shows a functional block diagram 300 that illustrates functionality of other aspects of the invention. In embodiments, FIG. 4 depicts system 300 comprising central management console 305, consumer computing device 310, provider computing devices 315, stubs 320, and virtual pipes 325. In embodiments, system 300 may also include any devices (not shown) configured to be used in a data center, cloud environment, or other network devices, such as routers, servers, or mobile devices. Central management console 305 may be a computing device (e.g., computing device 105 described with respect to FIG. 1) operable to manage and communicate with stubs 320 installed on multiple other computing devices (e.g., consumer computing device 310 and/or provider computing devices 315 such as a computing device 105 described with respect to FIG. 1) over a network. For example, central management console 305 may be a standalone computing device, a collection of computing devices in a single location (e.g., a server rack), or a collection of computing devices in a cloud infrastructure (e.g., cloud computing environment 200 described with respect to FIG. 2). In embodiments, central management console 305 includes software and/or hardware for real time activity monitoring and managing data exchanges between multiple other computing devices through the use of stubs 320. For example, central management console 305 may operate using a server based application configured for system virtualization and/or cloud management.

In embodiments, central management console 305 may be configured to manage secure data exchanges and shared network information utilizing stubs 320 (e.g., virtual API interface) installed on one or more computing devices. For example, central management console 305 may be configured to instruct stubs 320 installed on consumer computing device 310 and/or provider computing devices 315 to perform secure data exchanges by establishing virtual pipes 325. In embodiments, provider computing devices 315 may be configured to provide a service such as to one or more consumer computing device(s) 310; whereas consumer computing device 310 may be configured to consume the service of provider computing devices 315. For example, consumer computing device 310 may request information or request an action to be performed by provider computing devices 315 through an API exposed by the provider.

In embodiments, stubs 320 may be a predefined combination of generated program code and configurations stored and/or run on various computing devices. For example, stubs 320 may be software libraries or in process agents with security protections abstracted from hardware and embedded in a virtual layer. In embodiments, the libraries may include specifications for routines, data structures, object classes, and variables. In embodiments, stubs 320 may be software defined virtual API interfaces that are designed to ensure safe, consistent, efficient, and fully audited communications between processes for one or more running applications 330 such as an exchange of data. For example, running applications 330 utilize APIs that specify how the running applications 330 should interact with each other in order to share and process content between computing devices. In embodiments, each running application 330 on a particular computing device may have a unique stub responsible for securely exchanging data related to that running application 330.

In embodiments, stubs 320 may provide abstraction at a web service call level of running applications 330. For example, stubs 320 may provide a web service abstraction layer based on named components and relative Uniform Resource Identifiers (URI), with API-defined headers and payloads. Advantageously, stubs 320 may convert an API web service call received from running applications 330 into a raw HTTP call and transmit to a destination based on injected rules, routing information, and load balancing information received from central management console 305.

In embodiments, stubs 320 may be customized for a particular running application 330 or may be a generic stub to be used with multiple different running applications 330. For example, multiple running applications 330 may use a shared stub library to handle API web service calls. In embodiments, running applications 330 may have multiple instances of the application running and may have a stub for each instance, such that each instance on a single computing device may be recognized as one logical endpoint by central management console 305. In embodiments, stubs 320 may provide abstracted consistent security across multiple programming languages. For example, stubs 320 may be implemented in different computer languages based on the language used in running applications 330 (e.g., JAVA, C++, SQL, etc.). For example, running applications 330 based in JAVA may be provided with a JAVA stubs, such that the stub may be configured to understand the API web service calls from the JAVA running applications 330 and is capable of performing the called functions.

In embodiments, stubs 320 may provide a single level abstraction for establishing secure virtual pipes 325 (e.g., virtual connections such as TCP/IP connections) for the exchange of data directly between computing devices. For example, when running applications 330 on a first computing device initiates a web service call, the web service call may be redirected by stubs 320 on the first computing device, such that those stubs 320 will process the web service call. In embodiments, stubs 320 may process a web service call from running applications 330 by converting the web service call into raw HTML, encoding the HTML, and transmitting the HTML data to a destination endpoint.

In embodiments, stubs 320 may also act as a module for handling rest calls from other devices, forming http requests, processing, listening for requests, and responding to requests. For example, running applications 330 may make an API web service call and stubs 320 for the particular running applications 330 may handle all the steps prior to transmitting the data, such as encryption, addressing, throttling, and/or metering of the API call. Similarly, if an endpoint computing device (e.g., a computing device receiving the API call) has a stub, then stubs 320 for the endpoint computing device may handle all the steps prior to handing the API web service call off to the appropriate running applications 330. For example, stubs 320 for the endpoint computing device will perform authentication, handshaking, decryption of the received data, and/or direct the received data to the proper running applications 330.

Continuing with respect to FIGS. 3 and 4, in embodiments, the consumer computing devices 260 and 310, provider computing devices 265 and 315 and, and/or stubs 320 may provide data to the webs server 255 or central management console 305 respectively for customized monitoring and control purposes. For example, the consumer computing devices 260 and 310, provider computing devices 265 and 315 and, and/or stubs 320 may provide live performance metrics and traffic information to the webs server 255 or central management console 305 respectively. The live performance metrics and traffic information may include various measurements of performance of APIs for running applications 275 and 330 on the consumer computing devices 260 and 310 and/or provider computing devices 265 and 315. In embodiments, the various measurements of performance of APIs may include: (i) a total number of request messages, (ii) a total number of errors, (iii) a number of developers, (iv) a number of applications in use, (v) a total response time, (vi) a size of each request message, (vii) duration of request processing, (viii) a size of each message sent, (ix) longest response time, (x) shortest response time, and others.

In embodiments, using the live performance metrics and traffic information provided by the consumer computing devices 260 and 310, provider computing devices 265 and 315 and, and/or stubs 320, the webs server 255 or central management console 305 may assess the various measurements of performance of APIs to determine a performance status of each API. For example, the webs server 255 or central management console 305 may be configured to run a health determination process for determining a quantifiable health metric indicative of each API's "health" that is either weighted or non-weighted using health metric techniques known to those of skill in the art. In additional embodiments, the central management console 305 may be configured to use the live performance metrics and traffic information to modify the rules transmitted to stubs 320 to enable throttling of data, metering of data, pause and/or resume operation. Also, in additional embodiments, central management console 305 may instruct stubs 320 to add tagging/attributes to enable monitoring flows to create real time visualizations of the network and employ virtualization testing. For example, central management console 305 may track communications between computing devices without adding information to the data payload.

In embodiments, the webs server 255 or central management console 305 may be further configured to generate a GUI built into a browser using programming language, such as HyperText Markup Language, tool kits, e.g., open source modular JavaScript library, such as Dojo toolkits, and/or widgets, such as website or application widgets (e.g., a GUI displayed on a computing device 105 as discussed with respect to FIG. 1) to visualize and allow for interaction of the API and performance status of each API. For example the webs server 255 or central management console 305 may be configured to visualize the API and performance status of each API in a GUI comprising a dashboard with status indicators for each API. Additionally, in embodiments, the webs server 255 or central management console 305 may be configured to allow a user to use a syntax search to search for a particular API, select a historical time of the various APIs to change which various measurements of performance of APIs are being visualized in any given instance in time, drill down an retrieve greater detail concerning the methods of each API, and initiate a live API call from the GUI using one or more methods of an API of a running application 275 and 330 that return data in an open standard format used by the API for transmitting data between software applications.

In embodiments, the webs server 255 or central management console 305 may comprise the functionality to expose API methods with clear documentation and execute a live call to an API's method by using parameters exposed from the web service with a clear definition of what each parameter serves. In additional embodiments, a node.js server (not shown) may be configured to expose the API methods to the webs server 255 or central management console 305 using authentication services to verify user access to the methods. For example, a user trying to obtain additional detail regarding a particular method of an API may be required to provide authentication or user access credential to the node.js server threw the webs server 255 or central management console 305 for access to one or more methods of the API.

Figure 5:
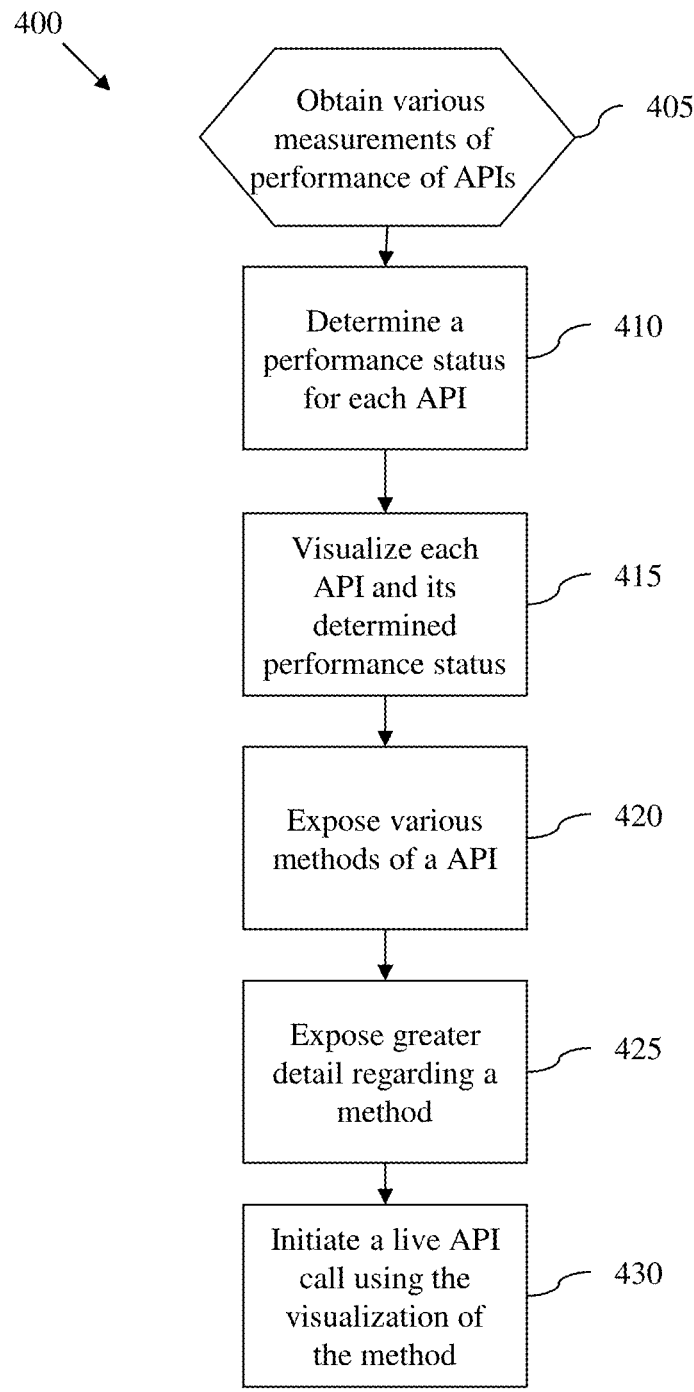
FIG. 5 shows an exemplary flow for a process in accordance with aspects of the invention.
Figure 12:
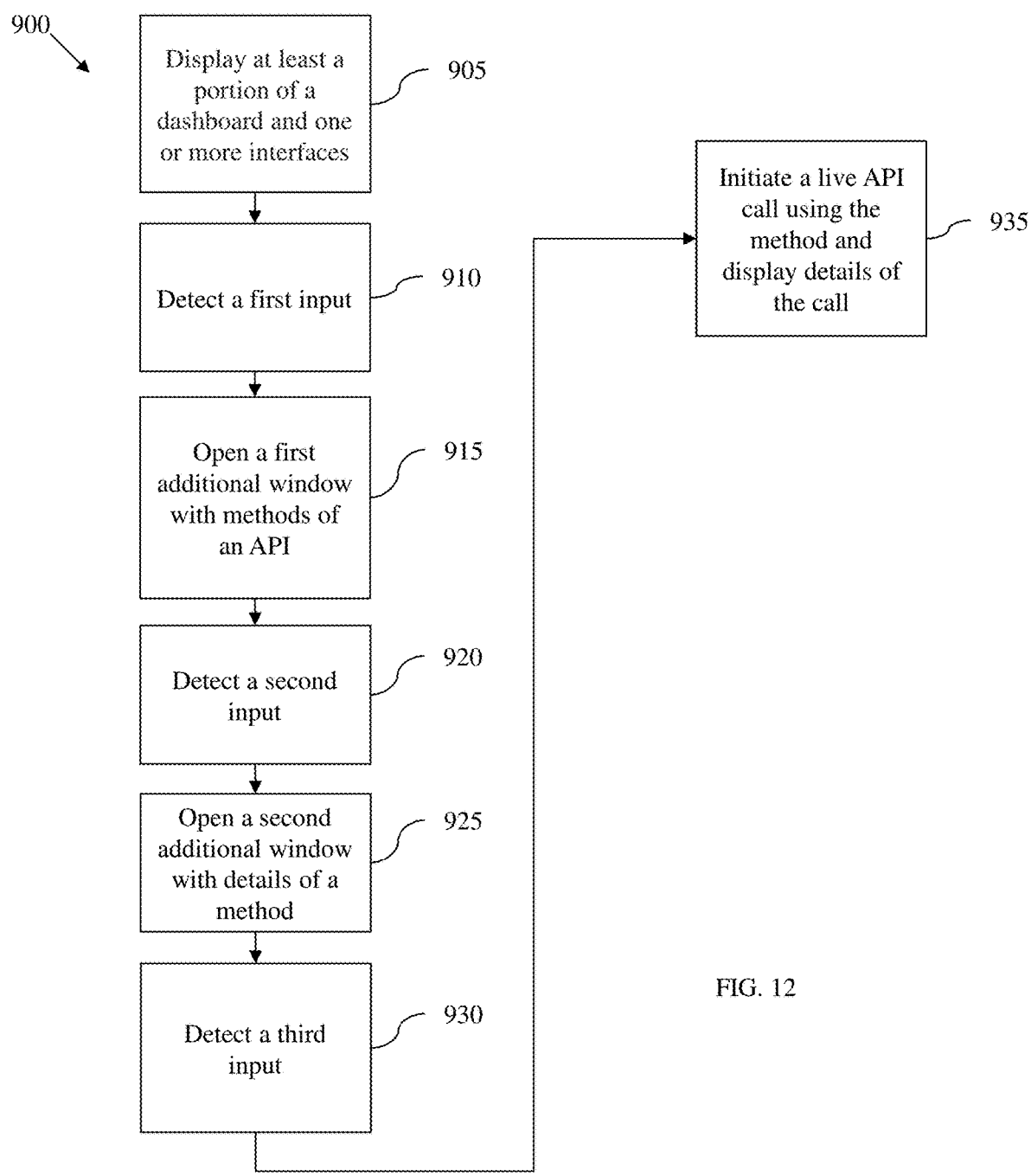
FIG. 12 shows an exemplary flow for a process in accordance with aspects of the invention.

FIGS. 5 and 12 depict exemplary flows for processes in accordance with aspects of the present invention. The exemplary flows can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flows of FIGS. 5 and 12 can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

FIG. 5 is a flow diagram illustrating a process 400 for assessing and displaying various measurements of performance of APIs on one or more computing devices in accordance with embodiments of the present invention. At step 405, various measurements of performance of the APIs may be obtained. For example, various measurements of performance of APIs may be obtained from the consumer computing devices, provider computing devices, and/or stubs (e.g., as described with respect to FIGS. 3 and 4) and saved into a database at the web server or central management console (e.g., as described with respect to FIGS. 3 and 4). In embodiments, the various measurements may be saved in the database in such a manner that the various measurements of performance are linked with its respective source stub and includes date and time stamps. For example, the various measurements of performance may be saved with metadata that comprises the source stub of the data and/or date and time information for the data.

At step 410, a performance status may be determined for each API. For example, the web server or central management console may be configured to run a health determination process for determining a quantifiable health metric indicative of each API's "health" that is either weighted or non-weighted using health metric techniques know to those of skill in the art. For example, the web server or central management console may be configured to analyze the various measurements of performance provided for each API, and determine a quantifiable health metric for each API based on the analysis of the various measurements of performance provided for each API.

In embodiments, the standard definitions for the various measurements of performance for the API may include (i) a total number of request messages, (ii) a total number of errors, (iii) a number of developers, (iv) a number of applications in use, (v) a total response time, (vi) a size of each request message, (vii) duration of request processing, (viii) a size of each message sent, (ix) longest response time, (x) shortest response time, and others. In embodiments, the quantifiable health metric provided for the API may be determined based on all measurements being equally important (e.g., non-weighted). However, in additional or alternative embodiments, weights may be applied to one or more of the standard definitions for the various measurements of performance, for example, using a multiplier for establishing priority of one measurement over another (e.g., weighted).

At step 415, each API and its determined quantifiable health metric may be visualized or illustrated. In embodiments, the visualization or illustration may be displayed as a GUI on a computing device (e.g., output devices 135 of computing device 105 as discussed with respect to FIG. 1). For example, the GUI may include a dashboard comprising each API, a visual indicator of the quantifiable health metric for each API, and a search bar for initiating a search for one or more APIs, as discussed in detail herein with reference to FIG. 6.

At step 420, each API may be selected or searched to drill down into or expose greater detail regarding each API. For example, selection or search of the API may open an additional window comprising a performance status as of a particular time, various measurements of performance, a history mechanism for navigating through time such that the various measurements of performance may be seen at different instances in time, and various methods utilized by the API, as discussed in detail herein with reference to FIGS. 6-9.

At step 425, each of the various methods may be selected to drill down into or expose greater detail regarding each method. For example, selection of a method may open an additional window comprising the purpose of method, the request URL for each method in XML and/or JSON format, request parameters of the method, error codes of the method, and any additional notes for the method, as discussed in detail herein with reference to FIGS. 10 and 11.

At step 430, a live API call may be initiated from the GUI using one or more methods of the selected API. In embodiments, the graphic user interface may be used by a user to select a method to initiate a live API call from the GUI using the method of the selected API of a running application that returns data in an open standard format used by the API for transmitting data between software applications, as discussed in detail herein with reference to FIG. 11.

Figure 6:
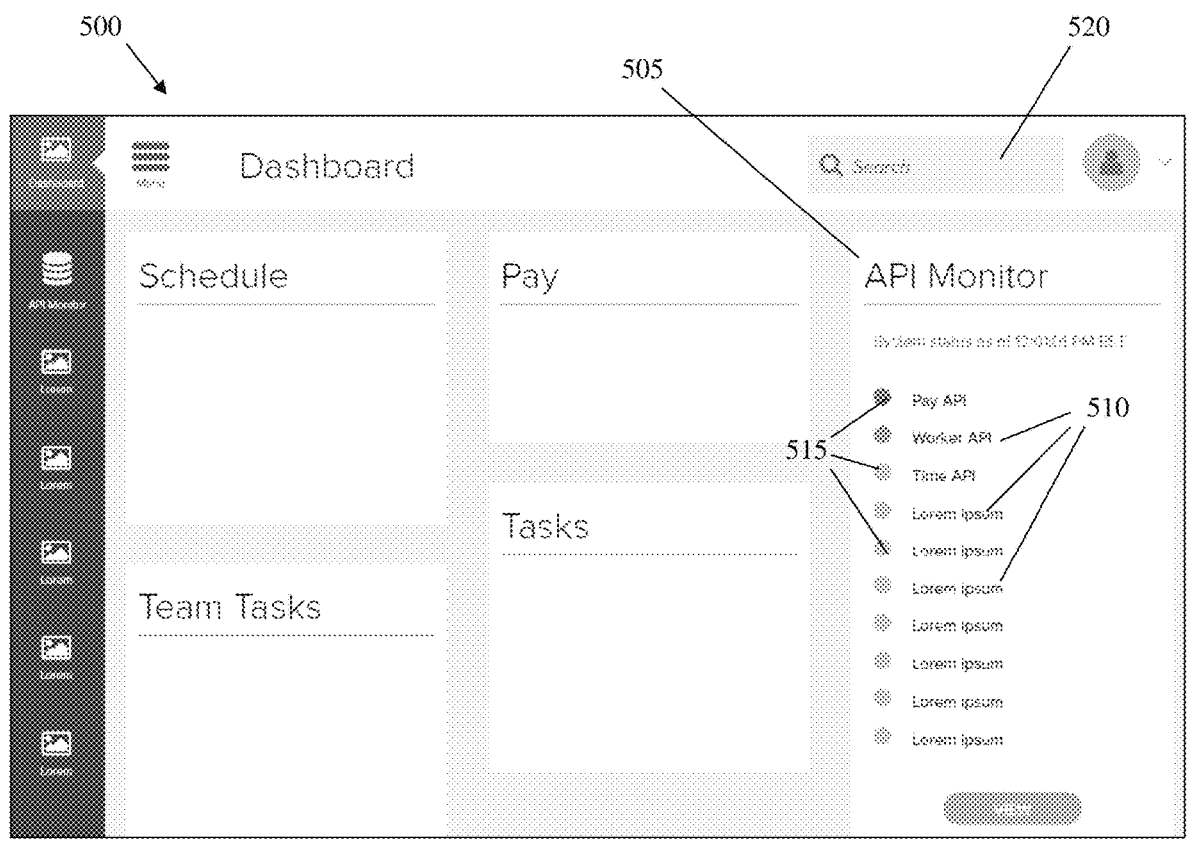
FIGS. 6-11 show visual representations of an example of operation in accordance with aspects of the invention.

FIGS. 6-11 show different determinations, assessments, manipulations, and modifications of various measurements of performance that may be performed and displayed to a user via the web server or central management console in a GUI. As shown in FIG. 6, the web server or central management console may be configured to generate an illustration 500 (e.g., a web page) having an API monitor 505 including various APIs 510 and visual indicators 515 of the quantifiable health metric for each API. In embodiments, the visual indicators 515 may be shown with lights having different colors, patterns, or textures such as a stop light pattern such that viewing the lights provides a user with information regarding the health of each API, e.g., a red light may indicate to a user that the API has failed, a green light may indicate to a user that the API is fully functional, and yellow light may indicate to a user some problems have been experience with the API. To this end, the illustration 500 may be displayed as a GUI on a computing device (e.g., output devices 135 of computing device 105 as discussed with respect to FIG. 1) configured to receive user input and interaction.

Figure 7:
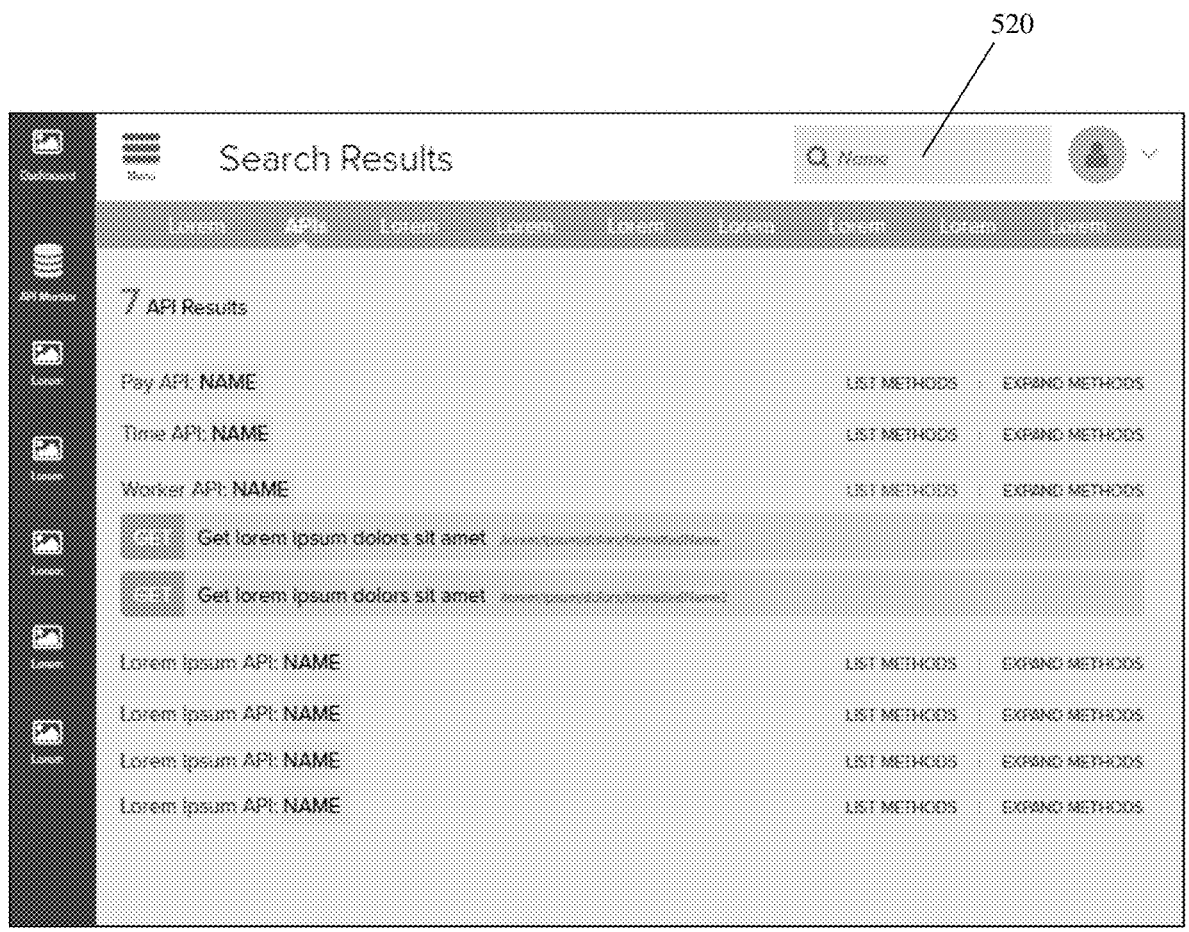
Figure 8:
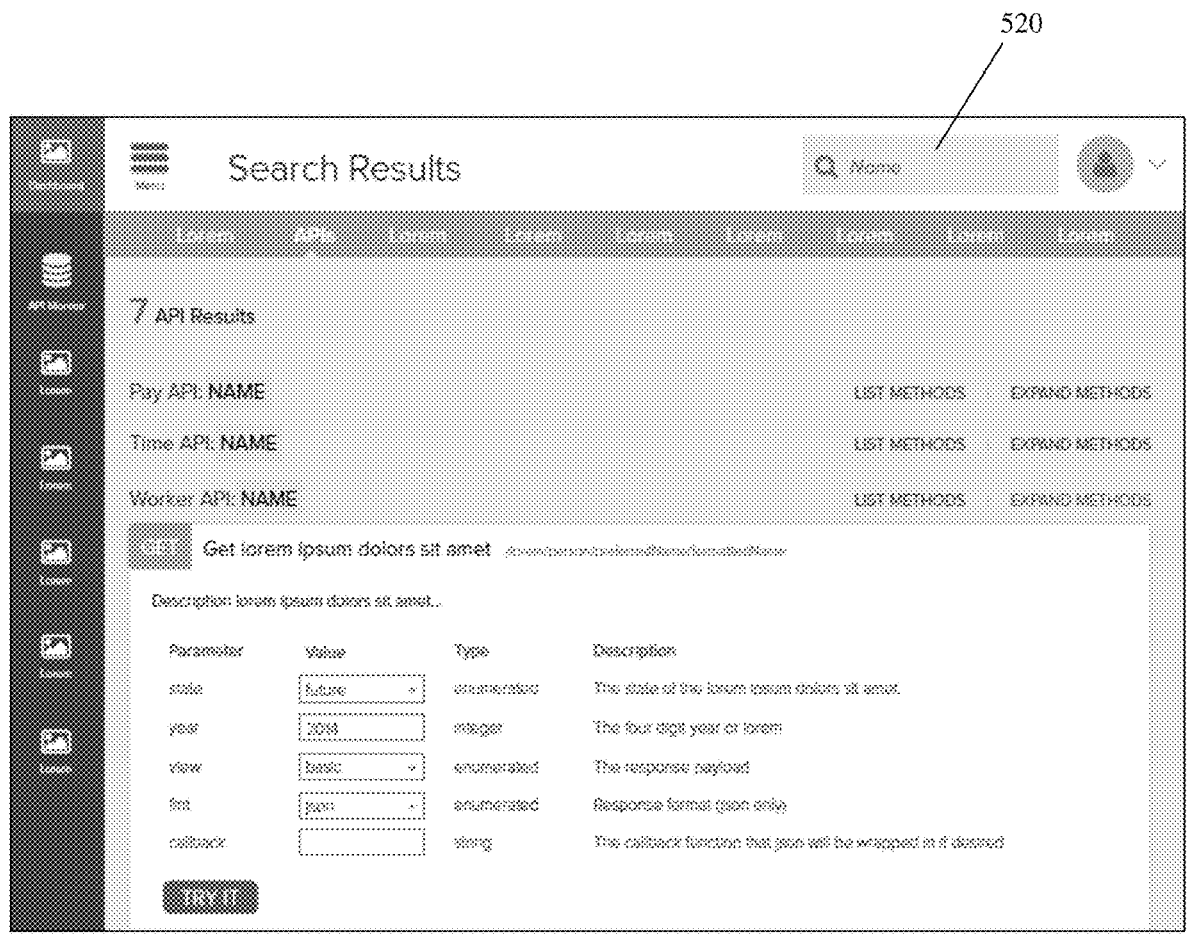

The illustration 500 may further include a search bar 520 for initiating a search (e.g., a syntax search) for one or more APIs. In embodiments, a user can utilize the search bar 520 to search for a specific API using keywords that can be compared to names of APIs within the dashboard, methods of various APIs, and comments of web services, as shown in FIGS. 7 and 8. For example, an API search result may be rendered within the web server or central management console based on the search of the keyword within the structure definition of an API. For example, a JSON schema definition may be stored in a database (e.g., a NoSQL database) in the following format:

```
Search for "name" within the .JSON file:
{
    "$schema": "http://json-schema.org/draft-04/schema#",
    "title": "Product",
    "description": "A name product from Acme's catalog",
    "type": "object",
    "properties": {
        "id": {
            "description": "The name identifier for a product",
            "type": "integer"
        },
        "name": {
            "description": "name of the product",
            "type": "string"
        },
        "price": {
            "type": "name",
            "minimum": 0,
            "exclusiveMinimum": true
        }
    },
    "required": ["id", "name", "price"]
}
```

Accordingly, a user can utilize the search bar 520 to search in the database for a specific keyword (e.g., "name") by issuing a query within all the fields of the JSON schema definitions stored in the database for each API.

In additional or alternative embodiments, a user can utilize the search bar 520 to execute a "FIND" command for a keyword in order to find the location of a folder storing the "api_schemaName_Definition.json". Thereafter, the web server or management console knows the File Name and API method that has the keyword in any of the descriptions, parameters, or parameter descriptions themselves. Accordingly, only sections of the html/pgp/xml file tree that have the keyword executed with the find command will be rendered as a result of executing a search via the search bar 520.

Figure 9:
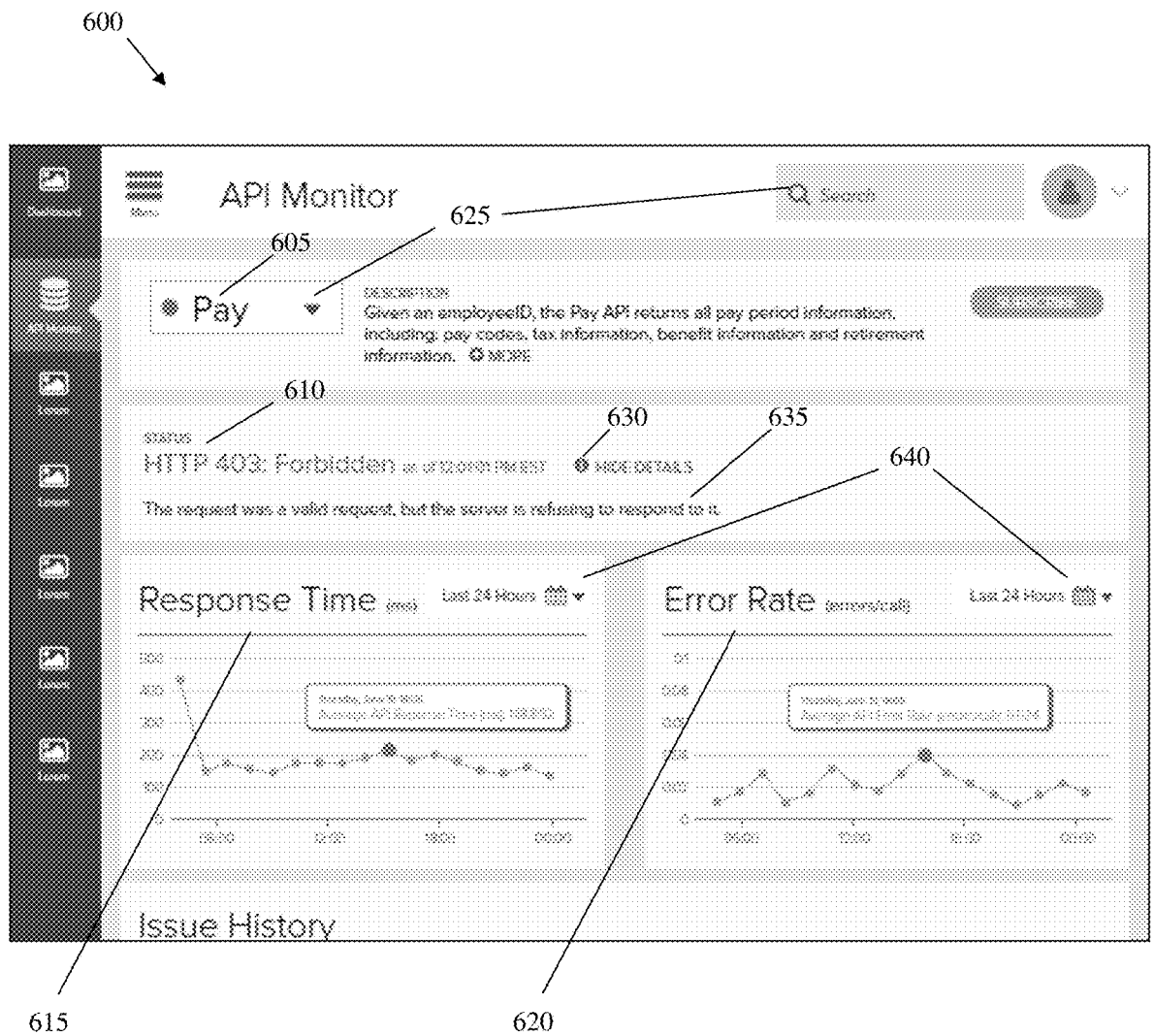

In embodiments, the illustration 500 may further allow for visualization of detailed information for each API 510, as shown in FIG. 9. For example, each API 510 within the API monitor 505 may be selectable (e.g., clickable via an input device) or searchable, as described above with respect to the search bar 520, to cause the web server or central management console to generate an additional window 600 (e.g., another web page or pop up window having an API dossier) that illustrates additional information for each API that includes a description 605 of the API, a status 610 of the API, and various measurements of performance of the API including response times 615 and error rates 620. The description 605 includes a set of functions or routines performed by the API that accomplish a specific task or are allowed to interact with a specific software component. The status 610 includes the status of the API such as operating normally, performance issues, service disruption, and/or informational messages, as of a specific time. The response time 615 includes data points provided in a graphical representation that are representative of a length of time that it takes to get a response from an API over a span of time (e.g., the last 24 hours). Error rate 620 includes data points provided in a graphical representation that are representative of a number of errors incurred by the API over a span of time (e.g., the last 24 hours).

In embodiments, the additional window 600 may further include one or more mechanisms 625 (e.g., a pull down list and/or search bar) to switch to a different API directly from the additional window 600, rather than navigating back to the preceding web page comprising illustration 500. The drop down list may present the APIs in any order, for example the APIs may be presented in order of severity of status with service disruptions listed at the top of the list and operating normally listed towards the bottom of the list. The additional window 600 may also include the details 630 of the status 610, which may be accessed by an informational message 635 (e.g., clickable via an input device). For example, the details 630 may include a description of the HTTP response.

In embodiments, the additional window 600 may further include a history mechanism 640 that may be utilized via a user to manipulate the various measurements of performance of APIs to view snapshots of the various measurements of performance at a particular time, which may be then be updated and displayed. Additionally, the history mechanism 640 may be configured to allow a user to scroll through the various measurements of performance by day and/or hour. Accordingly, it should be understood that embodiments of the present invention allow a user to review historical and/or current data as a single snap shot or as a sequence of successive snapshots.

Figure 10:
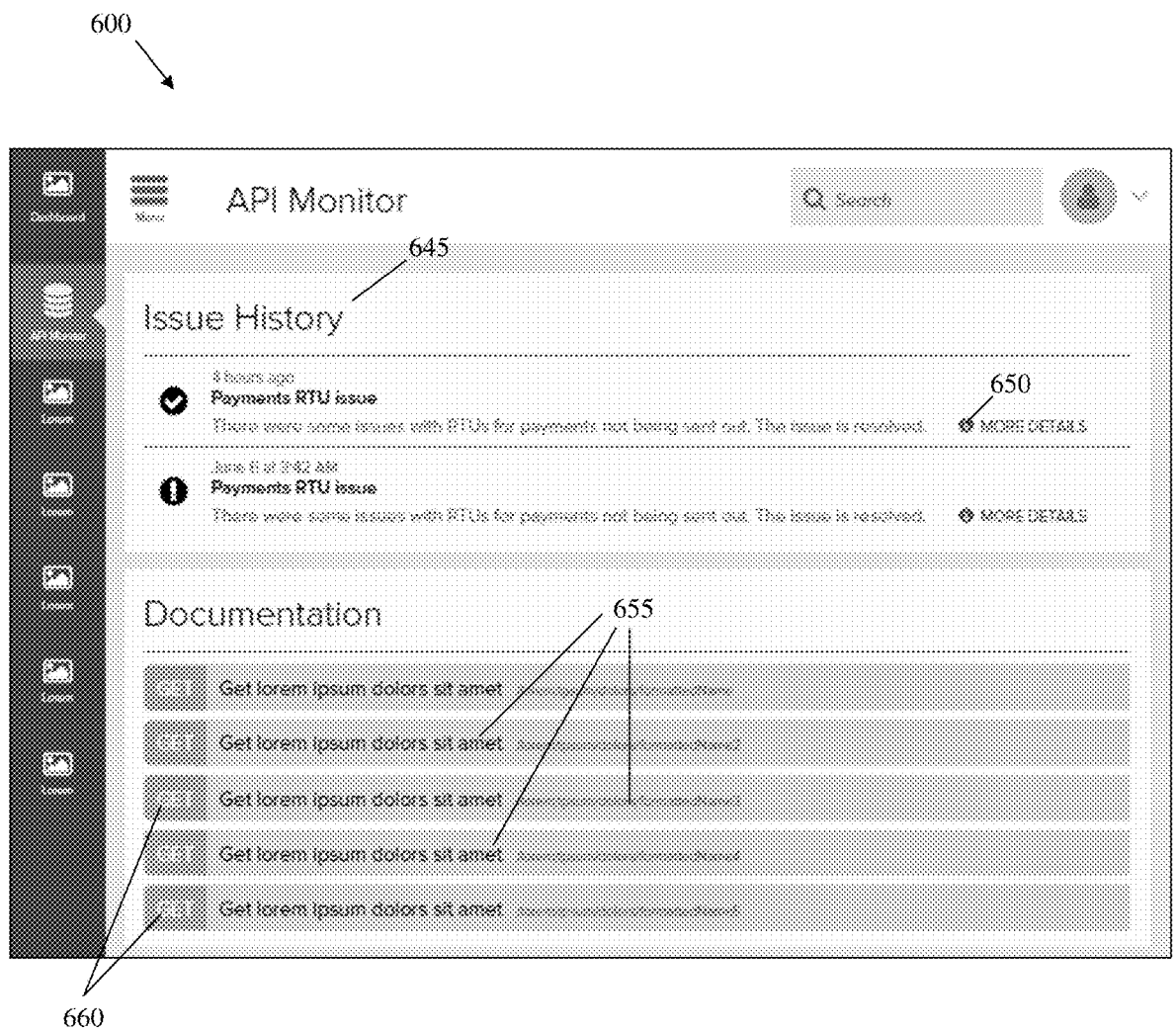

As shown in FIG. 10, the additional window 600 may also include an issue history 645 that includes any issues experienced by the API over a span of a predefined period of time. The issue history 645 may also include expanded details of the issues, which may be accessed by an informational message 650 (e.g., clickable via an input device). The additional window 600 also include the methods 655 (e.g., a method for retrieving all user data specified in an API request, a method for retrieving individual records by record ID, a method for downloading a file attached to a record, etc.) utilized by the API for accessing running applications. It should be understood that the methods described above are merely examples and such methods can be any methods for use with APIs to cause an application to perform a process without departing from the spirit and scope of the present invention.

In embodiments, the additional window 600 may further comprise: (i) a mechanism (not shown) for listing the methods 655, e.g., in a particular order or sequence, (ii) a mechanism (not shown) for expanding the methods 655, e.g., a opening the methods to reveal additional information regarding each method such as the purpose of method, the request URL for each method in XML and/or JSON format, request parameters of the method, error codes of the method, and any additional notes for the method, and (iii) a mechanism 660 for obtaining a method 655, e.g., a selectable (e.g., clickable via an input device) mechanism to cause the web server or central management console to generate an additional window 700 (e.g., new web page or a pop up window) that illustrates implementation of a particular method, as shown in FIG. 11.

In accordance with aspects of the invention, the web server or central management console may comprise the functionality to expose the methods 655 with understandable documentation including parameters exposed from the web service with a definition of what each parameter serves. For example, a node.js server may be configured to expose the API methods to the web server or central management console using authentication services to verify user access to the methods. Accordingly, a user trying to obtain additional detail regarding a particular method of an API may be required to provide authentication or user access credential to the node.js server threw the web server or central management console for access to one or more methods of the API.

Figure 11:
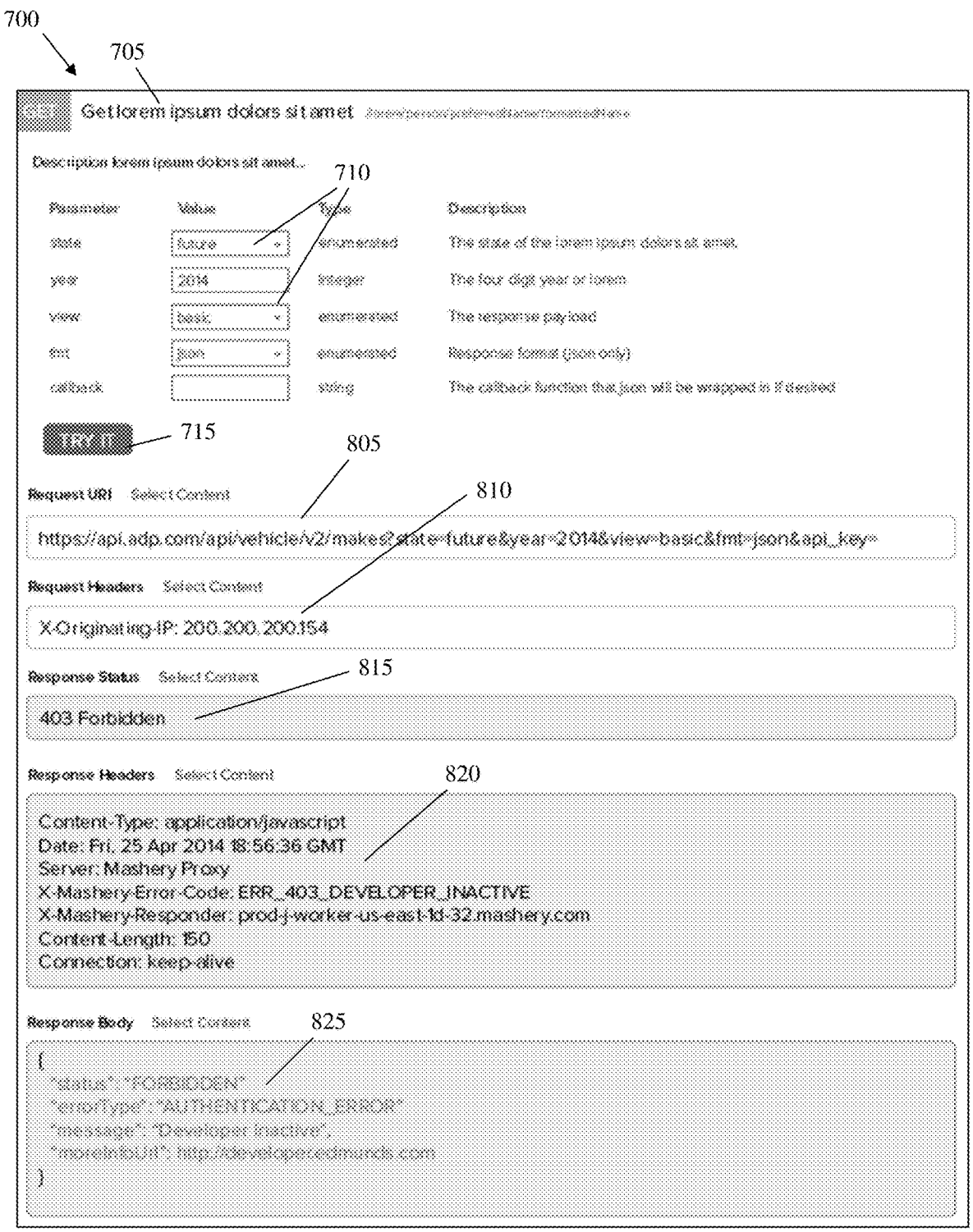

In embodiments, the additional window 700 may allow for executing a live API call from the GUI using one or more methods of the selected API of a running application that returns data in an open standard format used by the API for transmitting data between software applications, as shown in FIG. 11. For example, each mechanism 660 for obtaining a method 655 (shown in FIG. 10) may be selectable (e.g., clickable via an input device) to cause the web server or central management console to generate the additional window 700 (e.g., new web page or a pop up window) that illustrates implementation of the particular method 705 including parameters 710 for executing the method 705. In embodiments, each parameter 710 may be pre-populated with values for exemplary running of the method 705, or a user can modify the parameters 710 with their own select values. The additional window 700 may further comprise a mechanism 715 for executing the method 705, e.g., a selectable (e.g., clickable via an input device) mechanism to cause the web server or central management console to generate a call using the parameters 710 and returns data in an open standard format (e.g., XML or JSON) used by the API for transmitting data between software applications.

FIG. 11 also shows the additional window 700 may be configured to display in XML and/or JSON format the request URL 805 for the method, the request headers 810, the response status 815, which may be configured to provide additional detail on the health of the API, the response headers 820, and the response body 825. Accordingly, it should be understood that the methods and systems of the present invention are capable of testing each method of each API to determine functionality and additional health information regarding each API.

FIG. 12 is a flow diagram illustrating a process 900 for interacting with various measurements of performance of APIs on a computing device in accordance with embodiments of the present invention. At step 905, the computing device displays at least a portion of dashboard on a screen display with one or more interfaces. The dashboard comprises content such as various APIs and visual indicators of the quantifiable health metric for each API (e.g., APIs 510 and visual indicators 515, FIG. 6). In embodiments, at least a portion of the content may be displayed using modified text or graphics to distinguish a portion of the content from other portions of the content and provide a user with additional information concerning a portion of the content. For example, as described with respect to FIG. 6, the illustration 500 may be illustrated with distinguishing lights for the visual indicators to illustrate the quantifiable health metric for each API. In embodiments the various measurements of performance may be presented as a portion of a web page. In additional or alternative embodiments, the various measurements of performance may be presented as a hypertext markup language (HTML) or XML document.

At step 910, a first input (e.g., selection via input device 130, FIG. 1) may be detected on an API (e.g., an API 510, FIG. 6) or as a search inquiry (e.g., search bar 520) in the displayed portion of the dashboard. At step 915, in response to detecting the first input, at least a portion of a first additional window may be opened that illustrates additional information for the API that was selected or searched via the first input. The additional information may include a description of the API, a status of the API, and various measurements of performance of the API including response times and error rates. The additional information may further include any issues with the API and the methods (e.g., a method for retrieving all user data specified in an API request, a method for retrieving individual records by record ID, a method for downloading a file attached to a record, etc.) utilized by the API for accessing running applications.

While the portion of the first additional window is displayed, at step 920, a second input (e.g., selection via input device 130, FIG. 1) may be detected on a method (e.g., a method 655, FIG. 10) in the displayed portion of the first additional window. At step 925, in response to detecting the second input, at least a portion of a second additional window may be opened that illustrates additional information for the method such as parameters for executing the method.

While the portion of the second additional window is displayed, at step 930, a third input (e.g., selection via input device 130, FIG. 1) may be detected on a mechanism within a portion of the second additional window (e.g., mechanism 715, FIG. 11). At step 935, in response to detecting the third input, a call may be executed using the parameters of the method that returns data in an open standard format (e.g., XML or JSON) used by the API for transmitting data between software applications, as described with respect to FIG. 11.

In embodiments, displaying the one or more windows may comprise displaying the one or more windows on top of the displayed portion of the dashboard and one or more interfaces. For example, the one or more windows may be superimposed on top of the displayed portion of the dashboard and one or more interfaces. In some embodiments, the one or more windows may be semitransparent or opaque. In alternative embodiments, displaying the one or more windows may comprise opening the one or more windows in a separate web page.

As should be understood, aspects of the present invention allow for the measurements of performance to be collected and assessed for each API, and the API and performance status of each API to be visualized and interacted with via a web based GUI. More specifically, the systems and methods of the present invention allow for a user to assess the performance of APIs based on measurements of performance at an instance in time via a user friendly GUI, which allows the user to improve API performance, attract developers, troubleshoot problems, and, ultimately, make better business decisions related to API infrastructure.

In embodiments, the invention provides a computer-implemented method for measurements of performance to be collected and assessed for each API on a network infrastructure, and determinations, assessments, manipulations, and modifications of the various measurements of performance that may be performed and displayed to a user via a GUI. In this case, a computer system, such as computing system 100 (FIG. 1), can be provided on the network infrastructure and one or more systems, such as the web server or central management console, for performing the processes of the invention can be obtained (e.g., created, purchased, used, modified, etc.) and deployed on the network infrastructure.

In embodiments, the invention provides systems and methods that perform the process of the invention based on a subscription business model. To this end, a service provider, could create, maintain, support, etc., a computer infrastructure, such as computing system 100 (FIG. 1) that is configured to provide a service, for example, collecting and assessing measurements of performance for each API on a network infrastructure, to a consumer. In return, the service provider can receive payment from the consumer(s) under a subscription agreement such as a subscription price paid to have access to the computer infrastructure and/or service.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of providing performance data for a plurality of application programming interfaces (APIs), comprising:
    displaying, by a computer system, a dashboard including visual indicators of a quantifiable health metric regarding performance status for each of the APIs and a search bar configured for searching for a particular API of the displayed APIs;
    searching, by the computer system, for the particular API of displayed APIs using the search bar to perform a syntax search to compare a keyword indicative of the particular API to names of all the APIs displayed in the dashboard;
    obtaining, by the computer system, one or more various measurements of performance of the APIs associated with the performance status from stubs comprising virtual API interfaces coupled to the computer system; and
    initiating, by the computer system, a live API call to a running application on one or more computing devices after searching for the particular API,
    wherein the stubs are configured to convert the live API call to an HTTP call.

2. The method of claim 1, further comprising:
    obtaining, by the computer system, one or more various measurements of performance of the APIs associated with the performance status from stubs comprising virtual API interfaces coupled to the computer system; and
    saving, by the computer system, the one or more various measurements of performance in a database such that the one or more various measurements of performance are linked with each respective stub and include a date and time stamp.

3. The method of claim 1, further comprising determining the quantifiable health metric for each API that is indicative of the performance status for each API from multicolored lights indicative of the health of each API.

4. The method of claim 3, wherein the health metric is either weighted or non-weighted.

5. A method of providing performance data for a plurality of application programming interfaces (APIs), comprising:
    displaying, by a computer system, a dashboard including visual indicators of a quantifiable health metric regarding performance status for each of the APIs and a search bar configured for searching for a particular API of the displayed APIs;
    searching, by the computer system, for the particular API of displayed APIs using the search bar to perform a syntax search to compare a keyword indicative of the particular API to names of all the APIs displayed in the dashboard; and
    determining the quantifiable health metric for each API that is indicative of the performance status for each API from multicolored lights indicative of the health of each API,
    wherein the health metric is either weighted or non-weighted, and
    wherein a first color of the multicolor lights indicates that the API has failed, a second color of the multicolor lights indicates that the API is fully functional, and a third color of the multicolor lights indicates that the API has experienced a problem but is still functional.

6. The method of claim 1, further comprising receiving, by the computer system, a selection of the one of the APIs.

7. The method of claim 6, further comprising displaying, by the computer system, parameters of the one of the APIs.

8. The method of claim 1, wherein a service provider at least one of creates, maintains, and supports the computer system.

9. The method of claim 1, wherein the keyword is indicative of a particular API to all fields of JavaScript Object Notation (JSON) objects that have been used to define the APIs.

10. The method of claim 9, further comprising initiating, by the computer system, a live API call to a running application on one or more computing devices after the comparison of the keyword indicative of the particular API to all fields of JavaScript Object Notation (JSON) objects that have been used to define the APIs.

11. A computer program product comprising computer readable program instructions stored on non-transitory computer readable storage medium, the computer readable program instructions causing a computing system to:
    display, on a graphic user interface (GUI) of the computing system, a dashboard including a performance status for each of a plurality of APIs on one or more computing devices operably connected to a network and a search bar configured for searching for a particular API of the displayed APIs;
    search for the particular API of the displayed APIs using the search bar and a search technique configured to compare a keyword indicative of the particular API to names of all the APIs displayed in the dashboard; and
    select a method of the particular one of the APIs, using the GUI, to initiate a live API call from the GUI using the selected method,
    wherein the particular one of the APIs is a running application that returns data for transmitting data between software applications on the one or more computing devices.

12. The computer program product of claim 11, wherein the computer readable program instructions further cause the computing system to:
    obtain one or more various measurements of performance of the APIs associated with the performance status from stubs comprising virtual API interfaces coupled to the computing system; and
    save the one or more various measurements of performance in a database such that the one or more various measurements of performance are linked with each respective stub and include a date and time stamp.

13. The computer program product of claim 11, wherein the computer readable program instructions further cause the computing system to determine a quantifiable health metric for each API that is indicative of the performance status for each API.

14. The computer program product of claim 13, wherein the health metric is either weighted or non-weighted.

15. The computer program product of claim 14, wherein the performance status for each API is shown as a visual indicator of the quantifiable health metric determined for each API using multicolored lights.

16. A computer program product comprising computer readable program instructions stored on non-transitory computer readable storage medium, the computer readable program instructions causing a computing system to:
    display a dashboard including performance status for each of a plurality of APIs;
    detect an input on the dashboard that initiates a comparison of a keyword indicative of a particular API to all fields of JavaScript Object Notation (JSON) objects that have been used to define the APIs; and
    initiate a live API call to a running application on the one or more computing devices after the comparison of the keyword indicative of the particular API to all fields of JavaScript Object Notation (JSON) objects that have been used to define the APIs.

17. The computer program product of claim 16, wherein the computer readable program instructions further cause the computing system to display a search bar configured for searching for the particular API of the displayed APIs.

18. The computer program product of claim 16, wherein the computer readable program instructions further cause the computing system to search the one of the APIs and to open an additional window displaying a performance status of the one of the APIs as of a particular time.

19. The computer program product of claim 18, wherein the computer readable program instructions further cause the computing system to navigate through time to display predetermined measurements of performance at different instances in time in the additional window.

* * * * *